United States Patent [19]

Chen et al.

[11] Patent Number: 5,328,948

[45] Date of Patent: Jul. 12, 1994

[54] STABILIZATION OF HALOPOLYMERS WITH IONOMERS

[75] Inventors: Chii-Shu Chen, Parsippany, N.J.; L. Lawrence Chapoy, Lesa, Italy

[73] Assignee: Ausimont, U.S.A., Inc., Morristown, N.J.

[21] Appl. No.: 948,599

[22] Filed: Sep. 23, 1992

[51] Int. Cl.$^5$ .............................. C08K 5/09; C08K 5/42; C08K 5/3415

[52] U.S. Cl. ..................... 524/94; 524/101; 524/128; 524/151; 524/302; 524/399; 524/400; 524/482

[58] Field of Search ............... 524/303, 302, 128, 151, 524/101, 94, 482, 912, 399, 400, 353; 525/344, 367, 368, 330.2, 333.5

[56] References Cited

U.S. PATENT DOCUMENTS

| | | | |
|---|---|---|---|
| 3,338,739 | 8/1967 | Rees | 525/368 |
| 3,379,679 | 4/1968 | Besso | 524/178 |
| 3,678,047 | 7/1972 | Kletecka et al. | 524/101 |
| 3,705,137 | 12/1972 | Kuwahara et al. | 525/201 |
| 3,745,145 | 7/1973 | Khattab et al. | 524/128 |
| 3,773,698 | 11/1973 | Khattab et al. | 524/152 |
| 3,870,841 | 3/1975 | Makowski et al. | 525/344 |
| 3,947,525 | 3/1976 | Robertson et al. | 524/544 |
| 4,381,376 | 4/1983 | Albee et al. | 525/368 |
| 4,450,249 | 5/1984 | Schmidt et al. | 524/912 |
| 4,539,354 | 9/1985 | Chung et al. | 524/291 |
| 4,775,709 | 10/1988 | Chandrasekaran et al. | 524/545 |
| 4,775,723 | 10/1988 | Kuhne et al. | 525/369 |
| 4,801,649 | 1/1989 | Statz | 525/201 |
| 4,863,983 | 9/1989 | Johnson et al. | 525/199 |
| 5,202,381 | 4/1993 | Parker | 525/201 |

FOREIGN PATENT DOCUMENTS

| | | |
|---|---|---|
| 46-22113 | 6/1971 | Japan . |
| 47-22474 | 10/1972 | Japan . |
| 49-37989 | 4/1974 | Japan . |
| 51-62845 | 5/1976 | Japan . |
| 56-112954 | 9/1981 | Japan . |
| 59-51946 | 3/1984 | Japan . |
| 63-170454 | 7/1986 | Japan . |
| 61-271347 | 12/1986 | Japan . |
| 2-196845 | 8/1990 | Japan . |
| 9015828 | 12/1990 | PCT Int'l Appl. . |

*Primary Examiner*—Veronica P. Hoke
*Attorney, Agent, or Firm*—John G. Gilfillan; Raymond J. Lillie

[57] ABSTRACT

A composition comprising a halopolymer, such as an ethylene/chlorotrifluoroethylene copolymer, an effective stabilizing amount of an ionomer, and an effective stabilizing amount of a compound such as a phosphite of an organic polyhydric phenol; a thioester; a phosphite; or a hindered phenolic antioxidant. Preferred ionomers are metal salts of ethylene-acrylic acid copolymers, and metal salts of sulfonated polystyrenes. The stabilized halopolymers have improved resistance to thermal degradation and suffer less discoloration when subjected to high melt processing or extrusion molding temperatures.

23 Claims, No Drawings

STABILIZATION OF HALOPOLYMERS WITH IONOMERS

This invention relates to the stabilization of halopolymers. More particularly, this invention relates to the stabilization of halopolymers with ionomers.

Halopolymers, such as, for example, ethylene/chlorotrifluoroethylene copolymers, exhibit outstanding mechanical, electrical, and chemical properties at high temperatures. For example, ethylene/chlorotrifluoroethylene copolymers resist attack of most organic solvents at ambient as well as elevated temperatures, being only slightly soluble at 100° C. to 150° C. in a 2,5-dichlorobenzotrifluoride/benzonitrile or o-dichlorobenzene mixtures of 10:90 to 50:50 volume ratio. They are insoluble in bases and acids, including fuming nitric acid. These copolymers also possess high tensile strength and have melting points above about 200° C. and as high as about 260° C., which melting points are higher than those of the homopolymers of either ethylene (as high as 130° C.) or chlorotrifluoroethylene (as high as 215° C.). Equimolar ethylene/chlorotrifluoroethylene copolymers also have outstanding electrical properties. Because these copolymers have the advantageous properties hereinabove mentioned, they are suitable for making useful articles, such as valves, gaskets, pipes, wire and cable insulation, sheets or films for use in applications where their excellent mechanical, electrical, and chemical properties can be used to advantage.

Ethylene/chlorotrifluoroethylene copolymers, due to their high melting points in excess of about 220° C., require melt fabrication temperatures in excess of about 250° C., usually within the range of from about 260° C. to about 320° C. At such temperatures, bubble formation and degradation of the polymer occurs, which results in discoloration of the polymer and in the loss of chemical, electrical, and mechanical properties. In particular, loss of these properties occurs during extrusion wire coating, thereby causing high scrap rates for the process.

U.S. Pat. Nos. 3,745,145; 3,773,698 and 4,539,354 disclose various ethylene/chlorotrifluoroethylene copolymer compositions which are stabilized against thermal degradation. Generally used thermal stabilizing systems for these copolymers comprise a phosphite of an organic polyhydric phenol; a salt of a carboxylic acid and a metal of Group II of the periodic table; and a thiodipropionic acid ester or alkali metal salt. Although these stabilizing systems give good melt stability during injection molding of the polymer, the color of the molded product is less than satisfactory, especially when the temperature and residence time of the polymer during the fabrication process is severe, such as when large parts are being injection molded.

It is therefore an object of the present invention to provide an improved stabilizing system for halopolymers such as ethylene/chlorotrifluoroethylene copolymers.

In accordance with an aspect of the present invention, there is provided a composition comprising a halopolymer and an effective stabilizing amount of (a) an ionomer; and at least one component from group (b) selected from the group consisting of:

(i) a transesterification reaction product obtained from an organic polyhydric phenol selected from the group consisting of 1,1,3-tri (2-methyl-4-hydroxy-5-tert-butyl phenyl) butane, and a phenol of the formula:

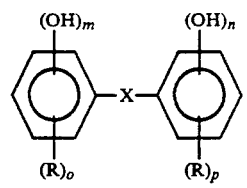

, wherein X is selected from the group consisting of oxygen, sulfur, alkylene, alicyclidene, arylidene, and mixed alkylene-arylidene and alkylene-alicyclidene groups, wherein the aliphatic or cycloaliphatic portion of the molecule may be a straight chain or a branched chain, having from 1 to about 18 carbon atoms, and wherein each R may be the same or different, and each R is independently selected from the group consisting of hydrogen and alkyl, straight or branched chain, and having from 1 to about 18 carbon atoms; and wherein m and n are integers from 1 to 5, and o and p are integers from 0 to 4, with the proviso that the sums of m+o and n+p may not exceed 5, and an organic phosphite triester free from phenolic hydroxyl groups, having up to about 60 carbon atoms obtained by transesterification of the phenol and phosphite) at an elevated temperature sufficient to form a homogeneous mixture;

(ii) a thioester;
(iii) a phosphite;
(iv) dibutyl maleate;
(v) n-phenylmaleimide;
(vi) acenaphthylene;
(vii) sodium formate;
(viii) N,N-metaphenylene dimaleimide;
(ix) 9,10-dihydroanthracene;
(x) triallyl cyanurate;
(xi) triallyl isocyanurate; and
(xii) hindered phenolic antioxidants.

The term "ionomer," as used herein, means a metal salt of an organic polymer.

In one embodiment, the ionomer is selected from the group consisting of: (a) a salt of an acrylic acid-containing polymer having the following structural formula:

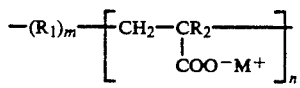

, wherein $R_1$ is an alkyl group having from 2 to 4 carbon atoms, $R_2$ is hydrogen or methyl, m is from about 10 to about 4,000, and n is from about 5 to about 2,000 (preferably the ratio of m to n is from about 0.5 to about 100), and $R_2$ is hydrogen or methyl; and (b) a sulfonated polystyrene having the following structural formula:

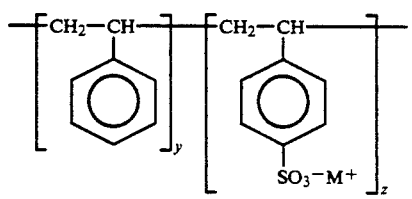

wherein y is from about 2 to about 2,000, and z is from about 1 to about 1,000. Preferably the ratio of y to z is from about 0.5 to about 100. M+ is a metal cation. In one embodiment, the metal cation is selected from the group consisting of lithium cations, sodium cations, potassium cations, calcium cations, barium cations, and zinc cations.

Although the scope of the present invention is not limited to any theoretical reasoning, it is believed that the ionomer reacts with hydrogen halides (such as hydrochloric acid and hydrogen fluoride) which are formed as a result of thermal degradation of the halopolymer, to form metal halides, while the ionomer accepts hydrogen ions from the hydrogen halides to form acids such as carboxylic acids or sulfonic acids. The ionomeric salt thus is converted to the free acid while neutralizing the liberated hydrogen halide resulting from polymer degradation.

In one embodiment, the ionomer is an acrylic acid-containing polymer having the following structural formula:

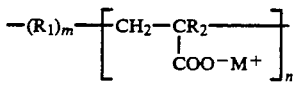

$R_1$ is an alkyl group having from 2 to 4 carbon atoms (preferably ethyl), $R_2$ is hydrogen or methyl, m is from about 10 to about 4,000, and n is from about 5 to about 2,000. M+ is a metal cation as hereinabove described, and preferably is a lithium cation, a sodium cation, a potassium cation, or a zinc cation.

The acrylic acid-containing polymer is present in an effective stabilizing amount. Preferably, the acrylic acid-containing polymer is present in an amount of from about 0.01 wt. % to about 5.0 wt.%, more preferably from about 0.05 wt.% to about 1.0 wt.%, based on the weight of the halopolymer.

In a preferred embodiment, the acrylic acid-containing polymer is a metal salt of an ethylene-acrylic acid copolymer, and may be obtained from Allied-Signal, Inc. under the tradename Aclyn, from DuPont under the trade name Surlyn, from Exxon under the tradename Iotek, or from Dow Chemical Company under the tradename Primacor. In one preferred embodiment, the metal salt of an ethylene-acrylic acid copolymer is a sodium salt of an ethylene-acrylic acid copolymer sold by Allied-Signal, Inc. as Aclyn 276A. This copolymer has a formula weight of about 1,425, and is sold in the form of a fine powder.

In yet another embodiment, the ionomer is a sulfonated polystyrene having the following structural formula:

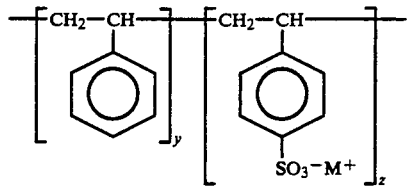

, wherein y is from about 2 to about 2,000, and z is from 1 to about 1,000, and M+ is a metal cation. Preferably, the metal cation is a lithium cation, a potassium cation, or a zinc cation.

The ionomeric sulfonated polystyrene is present in an effective stabilizing amount. Preferably, the ionomeric sulfonated polystyrene is present in an amount of from about 0.01 wt.% to about 5.0 wt.%, based on the weight of the halopolymer, more preferably from about 0.05 wt.% to about 1.0 wt.%.

In addition to the halopolymer and the ionomer, the composition further comprises an effective stabilizing amount of at least one of compounds (i) through (xii) in group (b) as hereinabove described.

In one embodiment, the compound in group (b) is compound (i). In another embodiment, the compound of group (b) is a phosphite. Preferably, the phosphite is tris (2,4-di-tert-butyl phenyl) phosphite.

In another embodiment, the compound in group (b) is a thioester. In a preferred embodiment, the thioester is distearylthiodipropionate.

In yet another embodiment, the compound of group (b) is a hindered phenolic antioxidant. In one embodiment, the hindered phenolic antioxidant is a phenolic complex which has the formula:

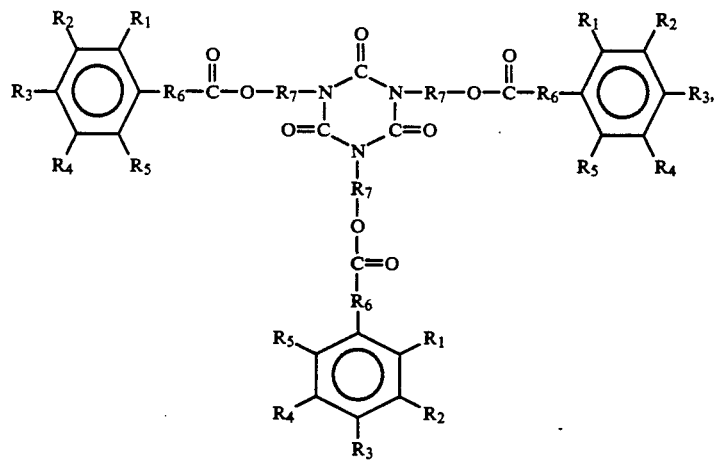

, wherein at least one of $R_1$ through $R_5$ is —OH, and the remaining $R_1$ through $R_5$ is hydrogen or an aliphatic hydrocarbon, and wherein each of $R_1$ through $R_5$ is hydrogen or an aliphatic hydrocarbon, and wherein each of $R_1$ through $R_5$ may be the same or different, provided that at least one of $R_1$ through $R_5$ is —OH, and each of $R_6$ and $R_7$ is an alkylene group having from 1 to about 10 carbon atoms, and each of $R_6$ and $R_7$ may be the same or different. Preferably the phenolic complex is a 3,5-di-t-butyl-4-hydroxy hydrocinnamic acid triester of 1,3,5,-tris (2-hydroxyethyl)-s-triazine 2,4,5-(1H,3H,5H)-trione.

In another embodiment, the hindered phenolic antioxidant is
an ester of a (4-hydroxy-di-alkylphenyl) alkanoic acid having the formula:

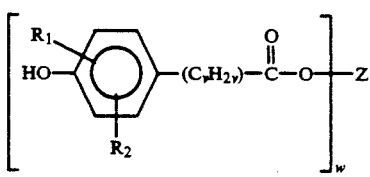

, wherein $R_1$ is methyl, ethyl, or an alpha-branched alkyl group having from 3 to 10 carbon atoms, $R_2$ is hydrogen, methyl, ethyl, or an alpha-branched alkyl group having from 3 to 10 carbon atoms, v has a value of from 1 to 6, w has a value of from 2 to 6, and Z is an aliphatic hydrocarbon having the formula:

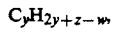

wherein y has a value of from 2 to 18 when w is 2 and a value of from 3 to 6 when w is greater than 2, the value of y in all cases being equal to or greater than that of w.

The above components of group (b), as hereinabove stated, are present in effective stabilizing amounts, preferably from about 0.01 wt.% to about 5.0 wt.%, more preferably from about 0.1 wt.% to about 1.0 wt.%, based on the weight of the copolymer.

Halopolymers which may be stabilized with the ionomers and compounds of group (b) of the present invention include, but are not limited to, ethylene/chlorotrifluoroethylene copolymers, polyvinyl chloride, chlorinated polyvinyl chloride, polyvinylidene chloride, ethylene/tetrafluoroethylene copolymer, polyvinylidene fluoride, polyvinyl fluoride, and hexafluoroisobutylene/vinylidene fluoride copolymer. In another embodiment, the halopolymer may further contain hexafluoroisobutylene monomer in an amount of up to about 10 wt. %. In one embodiment, the halopolymer is an ethylene/chlorotrifluoroethylene copolymer.

The ethylene/chlorotrifluoroethylene copolymer may, in one embodiment, include from about 40 mole % to about 60 mole % ethylene, and from about 40 mole % to about 60 mole % chlorotrifluoroethylene. Preferably, the ethylene/chlorotrifluoroethylene copolymer includes from about 45 mole % to about 55 mole % ethylene, and from about 45 mole % to about 55 mole % chlorotrifluoroethylene. More preferably, the copolymer includes about 50 mole % ethylene and about 50 mole % chlorotrifluoroethylene.

The ethylene/chlorotrifluoroethylene copolymer may have a melt index of from about 0.05 to about 1,000, preferably from about 0.1 to about 800, and more preferably from about 0.1 to about 500. Melt index may be measured in accordance with procedures described in ASTM D-1238 and ASTM D-3275.

The stabilized halopolymers of the present invention have improved color when melt processed at high temperatures (eg., from about 260° C. to about 320° C.); i.e., the halopolymers have improved whiteness and less discoloration following melt processing as compared with unstabilized halopolymers or stabilized halopolymers of the prior art.

In accordance with another aspect of the present invention, there is provided a composition comprising an ehtylene/chlorotrifluoroethylene copolymer, and an effective stabilizing amount of an ionomer. The ethylene/chlorotrifluoroethylene copolymer and the ionomer may be as those as hereinabove described, and the ionomer may be present in amounts hereinabove mentioned. The composition may also further comprise an effective stabilizing amount of at least one of compounds (i) through (xii) of group (b) hereinabove mentioned. Such compounds may be present in the amounts hereinabove described.

The invention will now be described with respect to the following examples; however, the scope of the present invention is not intended to be limited thereby.

EXAMPLES 1–8

In the following examples, an equimolar ethylene/chlorotrifluoroethylene copolymer sold by Ausimont, U.S.A., Inc. as HALAR E/CTFE was mixed with various stabilizers and tested for color rating. In the following examples, 100 parts of the ethylene/chlorotrifluoroethylene copolymer was dry blended in a Henschel high intensity mixer with one of the following stabilizing systems:

Example 1—0.375 part of a phosphite of an organic polyhydric phenol sold as Mark 260 by Argus Chemical Corp; and 0.606 part of a sodium ionomer of an ethylene/acrylic acid copolymer having a formula weight of 1,425, and sold by Allied-Signal, Inc. as Aclyn 276A.

Example 2—0.300 part of a 2:1 blend of a phosphite of an organic polyhydric phenol and zinc 2-ethylhexylate, sold by Argus Chemical Corp. as Mark 158; and 0.150 part distearylthiodipropionate.

Example 3—0.606 part of Aclyn 276A.

Example 4—0.375 part of Mark 260.

Example 5—0.375 part of Mark 260; and 0.188 parts distearylthiodipropionate.

Example 6—0.375 part of Mark 260; 0.606 part of Aclyn 276A; and 3.000 parts of polytetrafluoroethylene powder sold by Ausimont, U.S.A., Inc. as Polymist F5A.

Example 7—0.375 part of Mark 260; 0.606 part of Aclyn 276A; and 1.000 part of Polymist F5A.

Example 8—0.375 part of Mark 260; 0.606 parts of Aclyn 276A; and 0.100 parts of a perfluoropolyether fluid sold by Ausimont, U.S.A., Inc. as Fomblin YR.

The dry blend in each example was then melt blended using a twin screw extruder to obtain pellets of finely blended stabilized resin.

The pellets were then fed into a BOY Mipronic-plus injection molder, and molded at 290° C. to prepare 2"×3"×1/16" rectangular plaques. The plaques were molded with a mold residence time of 200 seconds.

The color rating of the molded plaques was determined by two different techniques. The first technique was a visual inspection technique wherein the plaques were rated on a scale of 1 to 5, with 1 corresponding to pure white and 5 corresponding to dark brown.

The second technique is a quantitative colorimetric measurement technique using a Macbeth Color-Eye 7000 Spectrophotometer. Colorimetric measurement is rated on a scale of 0 to 100, with 0 being black and 100 being pure white.

The visual color rating and quantitative colorimetric measurement for the plaques of Examples 1–8 are given in Table I below.

TABLE I

| Example | Visual Color Rating | Quantitative Colorimetric Measurement |
|---|---|---|
| 1 | 2 | 68.1 |
| 2 | 5 | 26.4 |
| 3 | 3 | 66.3 |
| 4 | 4 | 58.5 |
| 5 | 5 | 54.6 |
| 6 | 2 | 70.8 |
| 7 | 2 | 70.2 |
| 8 | 3 | 66.8 |

EXAMPLES 9–16

In the following examples, an equimolar ethylene/chlorotrifluoroethylene copolymer (HALAR E/CTFE) was mixed with various stabilizing systems, dry blended in a Henschel mixer, pelletized, and injection-molded at 290° C. to form plaques as described in Examples 1–8.

In the following examples, the following stabilizing systems, based on 100 parts of ethylene/chlorotrifluoroethylene copolymer were employed.

Example 9—0.300 part of a 3,5-di-t-butyl-4 hydroxy hydrocinnamic acid triester of 1,3,5-tris (2-hydroxyethyl)-s- triazine 2,4,5-(1H,3H,5H)-trione sold by the R.T. Vanderbilt Company as Vanox SKT; 0.300 part of tris (2,4-di-tert-butyl-phenyl) phosphite; and 0.606 part of Aclyn 276A.

Example 10—0.375 part of Mark 260; 0.606 part of Aclyn 276A; and 0.073 part of dibutyl maleate.

Example 11—0.303 part of Aclyn 276A; 0.150 part of Vanox SKT; and 0.150 part of tris (2,4-di-tert-butyl-phenyl) phosphite.

Example 12—0.375 part of Mark 260; and 0.268 part of an ethylene/acrylic acid lithium ionomer having a formula weight of 473.

Example 13—0.375 part of Mark 260; and 0.206 part of an ethylene/acrylic acid potassium ionomer having a formula weight of 339.

Example 14—0.375 part of Mark 260; and 1.278 parts of a sodium salt of sulfonated polystyrene containing 3.59 mole % of a sulfonic acid group.

Example 15—0.375 part of Mark 260; and 1.271 parts of a lithium salt of sulfonated polystyrene containing 3.59% of a sulfonic acid group.

Example 16—0.375 part of Mark 260; and 1.284 parts of a potassium salt of sulfonated polystyrene containing 3.59 mole% of a sulfonic acid group.

The plaques were then evaluated for color rating using a Macbeth Color-Eye 7000 Spectrophotometer as described in Examples 1–8. The quantitative color ratings for the plaques are given in Table II below.

TABLE II

| Example | Quantitative Colorimetric Measurement |
|---|---|
| 9 | 50.2 |
| 10 | 69.5 |
| 11 | 58.4 |
| 12 | 61.7 |
| 13 | 58.2 |
| 14 | 61.9 |
| 15 | 63.4 |
| 16 | 64.8 |

EXAMPLES 17–23

In the following examples, an equimolar ethylene/chlorotrifluoroethylene copolymer (HALAR E/CTFE) was mixed with various stabilizers, dry blended in a Henschel mixer, pelletized, and injection-molded at 290° C. as described in Examples 1–8.

In the following examples, the following stabilizing systems, based on 100 parts of ethylene/chlorotrifluoroethylene copolymer were employed.

Example 17—0.225 part of Mark 260; 0.150 part of distearylthiodipropionate; and 1.296 parts of a sulfonated polystyrene zinc ionomer having a formula weight of 6,096.7;

Example 18—0.225 part of Mark 260; 0.150 part of distearylthiodipropionate; and 0.611 part of a zinc ethylene acrylic acid ionomer sold by Allied-Signal, Inc. as Aclyn 295A, and which has a formula weight of 2,868.4;

Example 19—0.225 part of Mark 260; 0.150 part of distearylthiodipropionate; and 0.606 parts Aclyn 276A;

Example 20—0.225 part of Mark 260; and 0.606 part of Aclyn 276A;

Example 21—0.225 part of Mark 260; and 1.212 parts of Aclyn 276A;

Example 22—0.375 part of Mark 260; and 0.606 parts of Aclyn 276A;

Example 23—0.300 parts of Vanox SKT; 0.300 part of tris (2,4-di-tert-butyl phenyl) phosphite; and 0.606 part of Aclyn 276A.

The samples were then tested for melt stability, color rating, and bubble number.

For determining melt stability, melt extrudate color rating and propensity for bubble formation for the samples, a 7 gram sample of each pelletized composition was run on a melt index device in the manner described in ASTM D-1238 and ASTM D-3275 at a load of 2,160 g for 10 and 30 min. at 290° C. The extrudates were examined for change in melt index (MI) and for existence of bubbles. The change in melt index was recorded as melt stability and defined as follows:

$$\text{Melt Stability} = 100\% \times \frac{M.I. \text{ after heating} - \text{original } M.I.}{\text{original } M.I.}$$

The melt extrudate color rating was given by visual comparison of melt extrudates after heating for 30 minutes in a melt indexer and given a rating of from 0 (white) to 5 (black). The extrudates were also examined after heating for 10 minutes by slicing thin sections of the strands, and then photographing the cross-sections of extrudates through a microscope at 30× magnification. The number of bubbles for each cross-section is visually counted.

The melt stability, color rating, and bubble number for the samples of Examples 17–23 are given in Table III below.

TABLE III

| Bubble Example Number | Melt Stability 290° C., 30 min. | Melt Extrudate Color Rating | |
|---|---|---|---|
| 17 | −3.9% | 1.5 | 27 |
| 18 | 1.7% | 2.5 | 0 |
| 19 | 4.0% | 1.0 | 1 |
| 20 | 3.5% | 1.5 | 2 |
| 21 | −0.3% | 1.8 | 0 |
| 22 | −5.7% | 0.5 | 0 |
| 23 | 3.9% | 1.8 | 0 |

It is to be understood, however, that the scope of the present invention is not to be limited to the specific embodiments described above. The invention may be practiced other than as particularly described and still be within the scope of the accompanying claims.

What is claimed is:

1. A composition comprising:
   an ethylene/chlorotrifluoroethylene copolymer; and an effective stabilizing amount of (a) an ionomer selected from the group consisting of:
   (i) a salt of an acrylic acid-containing polymer having the following structural formula:

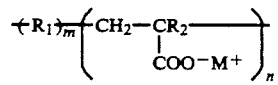

, wherein $R_1$ is an alkyl group having from 2 to 4 carbon atoms, $R_2$ is hydrogen or methyl, m is from about 10 to about 4,000, n is from about 5 to about 2,000 and $M+$ is a metal cation; and
   (ii) a sulfonated polystyrene having the following structural formula:

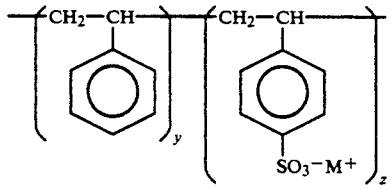

wherein y is from about 2 to about 2,000, and z is from 1 to about 1,000; and $M+$ is a metal cation; and
   (b) an effective stabilizing amount of at least one compound selected from the group consisting of:
   (i) a transesterification reaction product obtained from an organic polyhydric phenol selected from the group consisting of 1,1,3-tri-(2-methyl-4-hydroxy-5-tert-butyl phenyl) butane, and a phenol of the formula:

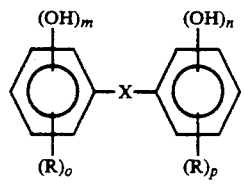

, wherein X is selected from the group consisting of oxygen, sulfur, alkylene, alicyclidene, arylidene, and mixed alkylene-arylidene and alkylene-alicyclidene groups, wherein the aliphatic or cycloaliphatic portion of the molecule may be a straight or a branched chain, having from 1 to about 18 carbon atoms, and wherein each R may be the same or difference, and each R is independently selected from the group consisting of hydrogen and alkyl, straight or branched chain, and having from 1 to about 18 carbon atoms; and wherein m and n are integers from 1 to 5, and o and p are integers from 0 to 4, with the proviso that the sums of M+o and n+p may not exceed 5, and an organic phosphite triester free from phenolic hydroxyl groups, having up to about 60 carbon atoms obtained by transesterification of the phenol and phosphite at an elevated temperature sufficient to form a homogeneous mixture;
   (ii) a thioester;
   (iii) a phosphite;
   (iv) dibutyl maleate;
   (v) n-phenylmaleimide;
   (vi) acenaphthylene;
   (vii) sodium formate;
   (viii) N,N-metaphenylene dimaleimide;
   (ix) 9,10-dihydroanthracene;
   (x) triallyl cyanurate;
   (xi) triallyl isocyanurate; and
   (xii) hindered phenolic antioxidants.

2. The composition of claim 1 wherein said ionomer is selected from the group consisting of:
   (a) a salt of an acrylic acid-containing polymer having the following structural formula:

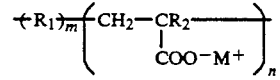

, wherein $R_1$ is an alkyl group having from 2 to 4 carbon atoms, $R_2$ is hydrogen or methyl, m is from about 10 to about 4,000, and n is from about 5 to about 2,000; and
   (b) a sulfonated polystyrene having the following structural formula:

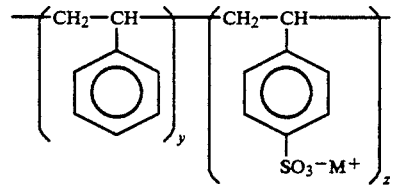

wherein y is from about 2 to about 2,000, and z is from 1 to about 1,000; and $M+$ is a metal cation.

3. The composition of claim 2 wherein $M+$ is a metal cation selected from the class consisting of lithium cations, sodium cations, potassium cations, calcium cations, barium cations, and zinc cations.

4. The composition of claim 2 wherein said ionomer is an acrylic acid-containing polymer having the following structural formula:

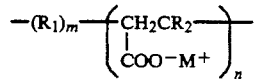

, wherein $R_1$ is an alkyl group having from 2 to 4 carbon atoms, $R_2$ is hydrogen or methyl, m is from about 10 to about 4,000, and n is from about 5 to about 2,000, and $M^+$ is a metal cation.

5. The composition of claim 4 wherein $R_1$ is ethyl.

6. The composition of claim 2 wherein said ionomer is a sulfonated polystyrene having the following structural formula:

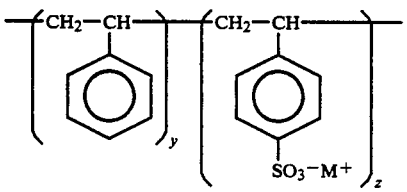

, wherein y is from about 2 to about 2,000, and z is from 1 to about 1,000, and $M^+$ is a metal cation.

7. The composition of claim 5 wherein said ionomer is present in an amount of from about 0.01 wt.% to about 5.0 wt.% based on the weight of said ethylene/chlorotrifluoroethylene copolymer.

8. The composition of claim 7 wherein said ionomer is present in an amount of from about 0.05 wt.% to about 1.0 wt.% based on the weight of said ethylene/chlorotrifluoroethylene copolymer.

9. The composition of claim 1 wherein said compound of group (b) is a transesterification reaction product obtained from an organic polyhydric phenol selected from the group consisting of 1,1,3-tri (2-methyl-4-hydroxy-5-tert-butyl phenyl) butane, and a phenol of the formula:

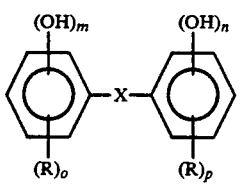

wherein X is selected from the group consisting of oxygen, sulfur, alkylene, alicyclidene, arylidene, and mixed alkylene-arylidene and alkylene-alicyclidene groups, wherein the aliphatic or cycloaliphatic portion of the molecule may be a straight chain or a branched chain, having from 1 to about 18 carbon atoms, and wherein each R may be the same or different, and each R is independently selected from the group consisting of hydrogen and alkyl, straight or branched chain, and having from 1 to about 18 carbon atoms; and wherein m and n are integers from 1 to 5, and o and p are integers from 0 to 4, with the proviso that the sums of m+ o and n +p may not exceed 5, and an organic phosphite triester free from phenolic hydroxyl groups, having up to about 60 carbon atoms obtained by transesterification of the phenol and phosphite at an elevated temperature sufficient to form a homogeneous mixture.

10. The composition of claim 1 wherein said at least one compound of group (b) is a thioester.

11. The composition of claim 10 wherein said thioester is distearylthiodipropionate.

12. The composition of claim 1 wherein said at least one compound of group (b) is a phosphite.

13. The composition of claim 12 wherein said phosphite is tris (2,4-di-tert-butyl phenyl) phosphite.

14. The composition of claim 1 wherein said at least one compound of group (b) is a hindered phenolic antioxidant.

15. The composition of claim 14 wherein said hindered phenolic antioxidant is a phenolic complex having the formula:

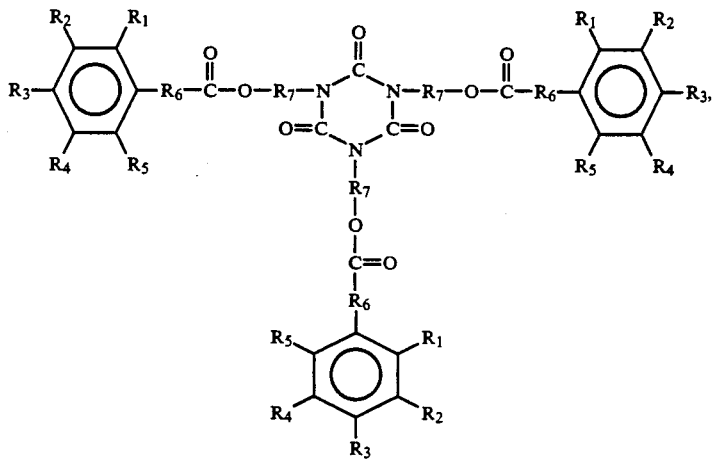

, wherein at least one of $R_1$ through $R_5$ is —OH, and the remaining $R_1$ through $R_5$ is hydrogen or an aliphatic hydrocarbon, and wherein each of $R_1$ through $R_5$ is hydrogen or an aliphatic hydrocarbon, and wherein each of $R_1$ through $R_5$ may be the same or different, provided that at least one of $R_1$ through $R_5$ is —OH, and each of $R_6$ and $R_7$ is an alkylene group having from 1 to about 10 carbon atoms, and each of $R_6$ and $R_7$ may be the same or different.

16. The composition of claim 15 wherein said phenolic complex is a 3,5-di-t-butyl-4-hydroxy hydrocinnamic acid triester of 1,3,5,-tris (2 -hydroxyethyl) - s-triazine 2,4,5- (1H, 3H, 5H) -trione.

17. The composition of claim 14 wherein said hindered phenolic antioxidant is an ester of a (4-hydroxy-di-alkylphenyl) alkanoic acid having the formula:

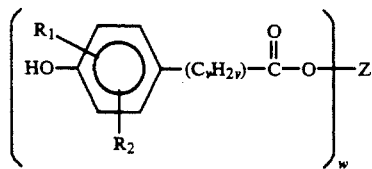

, wherein $R_1$ is methyl, ethyl, or an alpha-branched alkyl group having from 3 to 10 carbon atoms, $R_2$ is hydrogen, methyl, ethyl, or an alpha-branched alkyl group having from 3 to 10 carbon atoms, v has a value of from 1 to 6, w has a value of from 2 to 6, and Z is an aliphatic hydrocarbon having the formula:

$$C_yH_{2y+z-w}$$

wherein y has a value of from 2 to 18 when w is 2 and a value of from 3 to 6 when w is greater than 2, the value of y in all cases being equal to or greater than that of w.

18. The composition of claim 1 wherein said at least one compound of group (b) is present in an amount of from about 0.01 wt.% to about 5.0 wt.%, based on the weight of said ethylene/chlorotrifluoroethylene copolymer.

19. The composition of claim 18 wherein said at least one compound of group (b) is present in an amount of from about 0.1 wt.% to about 1.0 wt.%, based on the weight of said ethylene/chlorotrifluoroethylene copolymer.

20. The composition of claim 1 wherein said ethylene is present in an amount of from about 40 mole % to about 60 mole %, and said chlorotrifluoroethylene is present in an amount of from about 40 mole % to about 60 mole % of said ethylene/chlorotrifluoroethylene copolymer.

21. The composition of claim 20 wherein said ethylene is present in an amount of from about 45 mole % to about 55 mole %, and said chlorotrifluoroethylene is present in an amount of from about 45 mole % to about 55 mole % of said ethylene/chlorotrifluoroethylene copolymer.

22. The composition of claim 21 wherein said ethylene is present in an amount of about 50 mole %, and said chlorotrifluoroethylene is present in an amount of about 50 mole % of said ethylene/chlorotrifluoroethylene copolymer.

23. The composition of claim 1 wherein said ethylene/chlorotrifluoroethylene copolymer further contains hexafluoroisobutylene in an amount of up to about 10 mole %.

* * * * *